(12) United States Patent
Ghotbi et al.

(10) Patent No.: US 10,726,209 B2
(45) Date of Patent: Jul. 28, 2020

(54) IDENTIFICATION AND NOTIFICATION OF CORRECTNESS AND CONTRADICTION IN COMMUNICATIONS

(71) Applicant: Microsoft Technology Licensing, LLC, Redmond, WA (US)

(72) Inventors: Nikrouz Ghotbi, Redmond, WA (US); Ryen W White, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 46 days.

(21) Appl. No.: 15/818,118

(22) Filed: Nov. 20, 2017

(65) Prior Publication Data
US 2019/0155900 A1  May 23, 2019

(51) Int. Cl.
*G06F 40/35* (2020.01)
*G06N 20/00* (2019.01)

(52) U.S. Cl.
CPC ............ *G06F 40/35* (2020.01); *G06N 20/00* (2019.01)

(58) Field of Classification Search
CPC .............................. G06F 17/279; G06N 20/00
See application file for complete search history.

(56) References Cited

U.S. PATENT DOCUMENTS 10,070,283 B2 * 9/2018 Martin .................... H04W 4/18
2013/0158984 A1 * 6/2013 Myslinski ............... G06F 17/28
704/9
2013/0308920 A1   11/2013 Myslinski
2018/0341686 A1 * 11/2018 Hu ...................... G06F 16/3347

OTHER PUBLICATIONS

Sarr et al., "Automation of Fact-Checking: State of the Art, Obstacles and Perspectives," 2017 IEEE 15th Intl Conf on Dependable, Autonomic and Secure Comp., 15th Intl Conf on Pervasive Intelligence and Computing, 3rd Intl Conf on Big Data Intelligence and Comp. and Cyber Science and Tech, Nov. 11, 2017 (Year: 2017).*
Hassan et al., "Toward Automated Fact-Checking: Detecting Check-worthy Factual Claims by ClaimBuster", Proceedings of the 23rd ACM SIGKDD International Conference on Knowledge Discovery and Data Mining, pp. 1803-1812, Aug. 2017 (Year: 2017).*
Hassan, et al., "The Quest to Automate Fact-Checking", In Proceedings of the Computation and Journalism Symposium, Oct. 1, 2015, 5 Pages.
"International Search Report & Written Opinion Issued in PCT Application No. PCT/US18/060577", dated Feb. 27, 2019, 11 Pages.

* cited by examiner

*Primary Examiner* — Michelle M Koeth
(74) *Attorney, Agent, or Firm* — Shook, Hardy & Bacon, L.L.P.

(57) ABSTRACT

Apparatus and methods can be implemented to determine correctness and/or consistency of communications in a variety of applications. In various embodiments, a communication in a communication channel can be monitored, a feature from the monitored communication can be extracted for comparison with one or more sample features to determine correctness and/or an identification of a contradiction of the extracted feature from which remedial action can be taken. Additional apparatus, systems, and methods are disclosed.

20 Claims, 5 Drawing Sheets

IDENTIFICATION AND NOTIFICATION OF CORRECTNESS AND CONTRADICTION IN COMMUNICATIONS

TECHNICAL FIELD

Embodiments described herein generally relate to methods and apparatus related to electronic delivered communications between parties.

BACKGROUND

People cannot make good decisions, whether in their work or in their life outside work, if they are misinformed. Inaccurate statements can appear for many reasons, such as but not limited to inaccuracies in the sources used as the basis for such statements. Contradictory statements can appear for many reasons, such as but not limited to, memory lapses. Whatever the reasons for such statements, generation of a number of these statements over time can also erode trust and harm credibility of the one providing these statements.

DETAILED DESCRIPTION

Figure 1:
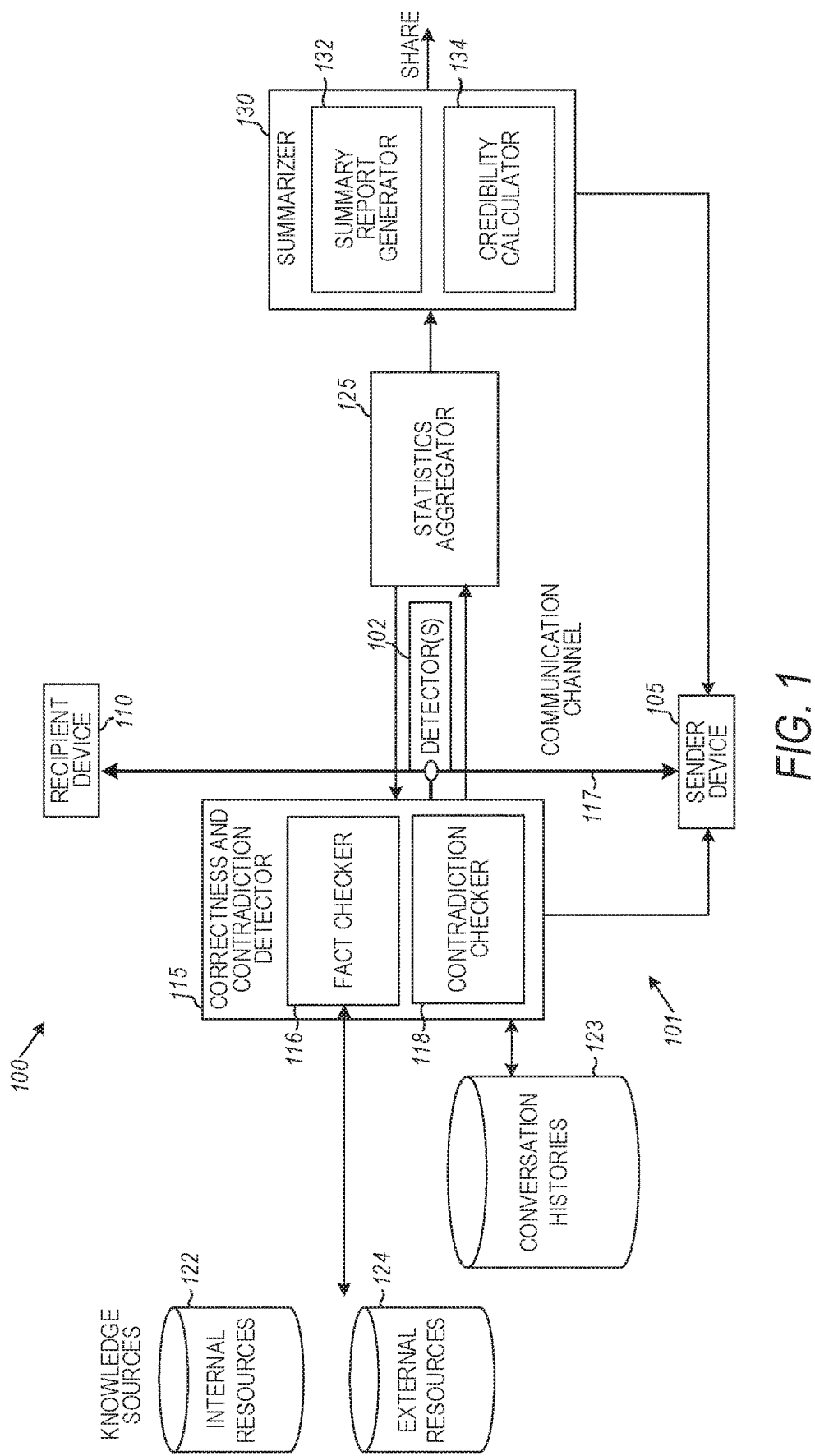
FIG. 1 is a schematic of an example architecture for a system that can detect correctness and/or consistency in communications between entities, in accordance with various embodiments.

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, mechanical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Typically, the term "cloud" with respect to data processing and communicating refers to a datacenter full of servers that is connected to the Internet. However, cloud may refer to any network or combinations of networks. A cloud can include a wide area network (WAN) like the public Internet or a private, national or global network, and may include a local area network (LAN) within an organization providing the services of the datacenter. In addition, the term "cloud computing" refers to the software and services executed for users by these servers, and typically the user is unaware of the physical location of the servers or datacenter. Further, the datacenter may be a distributed entity. Cloud computing can provide shared computer processing resources and data to computers and other devices on demand over the associated networks.

A virtual machine is a self-contained operating system or application environment that is installed on software, which imitates hardware and allows an end user to have an experience on a virtual machine that is the same as on the hardware. A system virtual machine provides an operating environment that functions as a separate computer, without access to a host operating system. A process virtual machine provides an application virtual machine as a platform-independent execution environment that itself runs as a normal application inside a host operating system and enables programs written for the virtual machine to execute in the same manner on any platform.

In various embodiments, systems and associated methods can be implemented to detect correctness and/or consistency in communications between people. Systems and associated methods can be implemented to detect correctness and/or consistency in communications between a person and a chatbot. A chatbot is a program that can conduct conversations via auditory or textual methods. Systems and methods, as taught herein, can be arranged to track communications between devices of individuals using a monitoring service capable of observing messages and to provide feedback on the veracity of statements made in communications between individuals. The feedback can be provided to the sender of the message during its composition, which can provide a mechanism for the sender to make sure what they send is correct. The feedback can be provided to the message recipient during the period of communication reception, which can provide a mechanism for the message recipient to know that what they receive is correct.

Messages can be sent via many channels, including but not limited to email, short message service (SMS), voice, and instant messaging. The channels can also include an audio signal, which can be transformed into a format amenable in comparison with previous statements of an entity in a communication to detect contradictions in the communication, or in comparison with what is known about the entities involved in the communication and/or the world to detect inaccuracies.

Consider the following example. Person one is meeting with a group including person two over an Internet communication channel such as, for example, a Skype meeting. Person two states, in the Skype meeting, sales numbers from the previous year. Using a system implemented to detect correctness and/or consistency in communications coupled to the meeting, the system can highlight, on one or more displays via one or more user interfaces for one or more communication devices, numbers from the sales number that are not correct and share references having the correct numbers so that the group can be informed. Optionally, in a meeting in which the sales numbers from the previous year are presented on one or more displays, the provider of the sales numbers can be alerted to the potential inaccuracy when the provider activates a transmission of the sales numbers and before other people of the group receive the message. The transmission can be activated by clicking a "Send" icon of a display, pressing an "Enter" key of a device, or other mechanism of a user interface to initiate the transmission. A user interface is instructions executable by a processor or selectable circuits executable by a controller by which a user can control a software application, hardware device, or a combination of a software application and a hardware device. The user interface can determine how commands are given to a machine, such as a computer, or to a software program and how information is provided on a display. A user interface can include a graphical user interface (GUI), which can provide graphical controls that may perform various functions. These graphical controls may be selected using a mouse, a keyboard, a touch screen, or other selection device. The system can have access to databases providing knowledge of enterprise data and can reference the enterprise data for more productive meetings and decision making. The system can be arranged to provide the identification of incorrect statements and references having the correct numbers to selected ones of the group.

Consider another example. A person is watching a news program on a television or a computer having instrumentalities to provide the news program in a room having a system implemented to detect correctness and/or consistency. The system can include an audio input, such as a microphone, and an audio output, such as a speaker. A topic on international trade is presented in the news program and can be received in the audio input of the system. The system can access a database of knowledge of currents events, news, and the world in general. The access can be to a local database or to a database accessible by the Internet or an intranet associated with the room in which content of the news is being presented. The access can be via wired connections or wireless connections. Based on the access, the system can highlight, via the speaker, that the trade facts are not up to date and share recent references.

Consider another example. Person one is talking to person two and person two mentions results from a research study conducted last year. A system implemented to detect correctness and/or consistency can highlight, on a display via a user interface of a device being used by person one, that the numbers being quoted are different than the last time that these numbers were mentioned by one of person one or person two. The system can provide those numbers on the display so that person one while talking to person two can be provided the right answers. The system can access a database that includes past conversations and can fact check new conversations with a person against the old conversations for accuracy.

FIG. 1 is a schematic of an embodiment of an example architecture 100 for a system 101 that can detect correctness and/or consistency in communications between entities. Architecture 100 can be applied for use in the above examples. Architecture 100 can include system 101 having one or more detectors 102 arranged with respect to a communication channel 117, where the one or more detectors 102 provide input to a correctness and contradiction detector 115 of system 101, based on a communication in communication channel 117. The one or more detectors 102 may be arranged to monitor communication channel 117 at a selected location from within a sender device 105 to within a recipient device 105, depending on the application.

Correctness and contradiction detector 115 of system 101 can include a fact checker 116 and a contradiction checker 118. Correctness is the quality of state of being free from error. With a statement or other components of a conversation, vocal or written, having a number of elements, such statement or component may include portions of the statement or component that are accurate and may include portions that are not accurate. A measure of correctness for the statement or component can be realized as a binary measure that has two states: correct or incorrect. Alternatively, a measure of correctness can include an assessment of an additional state such as partially correct. Correctness and contradiction detector 115 can include one or more bots to access data from knowledge sources and/or repositories of historical data. A bot is a program that can access web sites and gather content based on a provided search index. The web sites can be coupled to the Internet, an intranet, or the web sites may be databases, each database accessible by its own addresses according to a protocol for the respective database.

Fact checker 116 can be communicatively coupled with knowledge sources, which may include internal resources 122 and/or external resources 124. Contradiction checker 118 can be communicatively coupled with a database of conversation histories 123. Correctness and contradiction detector 115 can provide inputs to sender device 105 based on content in the communication using communication channel 117 between sender device 105 and recipient device 110.

In architecture 100, system 101 can operatively observe a conversation between two entities, using one or more detectors 102, which entities are communicating using sender device 105 and recipient device 110 operating with respect to communication channel 117. The conversation may be a conversation such as an email, instant messaging, or other non-audio transmission between sender device 105 and recipient device 110. The conversation may be a voice conversation or other audio conversation between sender device 105 and recipient device 110. The conversation may include a video or graphic symbols of content that is part of the conversation such as a topic of the conversation, where the graphic symbols may provide a pictorial representation of the content. At the end of each statement, such as a phrase, a sentence, a paragraph, or other selected interval, system 101 can assign an accuracy score to the respective statement based on system knowledge about the world, where the system knowledge can include personal data of the user of the sender device 105, data in an enterprise system of an organization associated with sender device 105, and data that is available on the open Internet. The one or more detectors 102 of system 101 can be realized as dialog listeners.

The one or more detectors 102 of system 101, such as but not limited to dialog listeners, can be implemented as a network proxy that communications, which may be between individuals, pass through in route from sender device to recipient device. A network proxy is a system or an application that acts as an intermediary for requests from a first system or application from a second system or application. The one or more detectors 102 may be implemented in other ways to intercept network traffic, like electronic sniffing. For example, packet sniffing can be used, which allows individuals to capture data as it is transmitted over a network. Capturing data refers to a process of obtaining information and delivering to a holding device, such as a temporary storage device for real-time application or a long-term a storage device for future reference. Such sniffing techniques have been used by network professionals to diagnose network issues, and by malicious users to capture unencrypted data. The one or more detectors 102 of system 101 can be implemented to operate with user consent and to adhere to all state and federal laws regarding the interception of communications.

The one or more detectors 102 of system 101 can intercept messages sent between devices of two or more individuals over the course of a conversation. Such detectors can pass the content of the messages and any relevant metadata to other devices that can provide services. The services can include services of correctness and contradiction detector 115. The one or more detectors 102 of system 101 can allow the original messages to pass through, so that the messages reach the intended recipient devices. The one or more detectors 102 may record the communications for future analysis, though the one or more detectors 102 may refrain from recording in real-time operations.

The one or more detectors 102 can be structured in a number of different manners depending on the application and type of conversation. For example, as a user executes a conversation, the message signal can be directed into communication channel 117 with the one or more detectors 102 in line with the communication channel 117 to capture the message signal and direct the message signal to correctness and contradiction detector 115 according to selected intervals in the communication. Transmission of the message signal can be delayed for a relatively short amount of time for completion of operations associated with determining correctness or contradictions made using sender device 105.

For an audio conversation, the one or more detectors 102 can include a speech recognition application executable by a processor. Audio files, video files, and graphic symbols or other pictorial representations may also be captured to be compared with sample files of the same type in a database. These files and representations may be part of the content of a conversation used for example as factual statements. The one or more detectors 102 can include an intelligent personal assistant device having audio input and audio output capabilities in which the intelligent personal assistant device can recognize natural voice input and provide output in a natural voice. An intelligent personal assistant device can include stored instructions or be arranged as a learning machine, whose operation can be executed by one or more processors. The intelligent personal assistant device can include instructions for determining correctness and contradictions in the content of a communication in a communication channel to which it has access. Such an intelligent personal assistant device can include the one or more detectors 102 integrated with correctness and contradiction detector 115.

By monitoring individual statements during a conversation, feedback regarding correctness and/or consistency can be conveyed to the user of sender device 105 during the conversation. This feedback can allow the user to correct his/her statements or clarify his/her position. By monitoring individual statements of a user over time from one or more devices, inferences can be made about how frequently the statements are correct and how consistently the statements maintain a position. These measures of correctness and/or consistency can be converted into scores that could be conveyed to the user to weigh the reliability of the information being shared. This score could also be aggregated across many conversations for that user to estimate the user's credibility in general and provide constructive feedback to the user of sender device 105. The user may choose to provide consent to share that score to recipient of a conversation or more broadly.

Once a communication in a communication channel has been monitored for an interval by the one or more detectors 102, a feature from the monitored communication can be extracted, where the feature represents a portion of content of the communication. The feature may include, but is not limited to, a phrase, a sentence, a paragraph, an audio file, video or graphic symbols of content that is part of the communication monitored. Along with features from the conversation, other features related to the conversation can be extracted in a number of ways, for example, by a deep learning method, a natural language processing (NLP) method, and other information extraction methods. Deep learning methods belong to a family of machine learning methods related to learning data representations, where the learning can be supervised, partially supervised, and unsupervised. Deep learning methods can include deep neural networks, deep belief networks, and recurrent neural networks. A NLP method is a method using a machine program to understand human language as it is spoken. NLP is typically a component of artificial intelligence.

Such methods can be implemented to extract identities of entities associated with the conversation and relationships between the entities. The methods can be used to convert the features from the monitored communication into a consistent representation that can be compared across conversations and resources. A consistent representation can include the converted feature modified to remove or adjust elements of the extracted feature that are not consistent with patterns of conversation of the identified entities and/or their relationships. A consistent representation can include the feature converted to one or more formats of one or more stored sample features for comparison of the feature with the one or more stored sample features. The extraction procedure can be performed by correctness and contradiction detector 115. The feature from the monitored communication can be provided to correctness and contradiction detector 115 using a wired transmission medium or a wireless transmission medium on a communication channel different from communication channel 117.

Correctness and contradiction detector 115 includes instructions stored in a memory device that are executable by a process to convert the features into a consistent representation and/or to determine the occurrence of an incorrect statement and/or contradiction in the captured feature of the monitored communication. Correctness and contradiction detector 115 can be coupled with a statistics aggregator 125 to receive data regarding correctness and contradictions from prior communications of the user of the sender device 105 with the recipient of the current communication or related prior communications. Fact checker 116 of correctness and contradiction detector 115 can be coupled with internal resources 122, such as but not limited to an intranet of an organization associated with the user of sender device 105, which act as an internal database. Fact checker 116 can be coupled with external resources 124, such as but not limited to web sites via the Internet, which act as an external database. Real-time access to internal resources 122 and external resources 124 can provide one or more sample features for which to compare the representation of the feature extracted from monitoring the current communication. With respect to signal/data processing, by real-time is meant completing some signal/data processing task within a time that is sufficient to keep up with an external process, such as conducting communications in a communication channel in an acceptable timeframe.

Contradiction checker 118 of correctness and contradiction detector 115 can be coupled with the database of conversation histories 123 to provide one or more features of past conversations of the user of sender device 105 for which to compare the representation of the feature extracted from monitoring the current communication. The past conversations of the user of sender device 105 can be past conversations with the recipient of the current communication, past conversations with others on the topic of the extracted feature, or past statements of the user of sender device 105 made in other forums, private and public. Contradiction checker 118 can determine the existence of a contradiction in the current conversation by the comparison with the sample past conversations of the user of sender device 105.

From the comparisons by fact checker 116 and/or contradiction checker 118, a measure of correctness of the extracted feature can be generated from one or more of the comparisons. Correctness and contradiction detector 115 can generate detector scores to sender device 105, which can include an indication of the measure of correctness and/or the identification of the contradiction. The feedback to sender device 105 can be conducted during composition or recital of the message being communicated by sender device 105 to recipient device 110.

The indication can be implemented for example by highlighting inline parts of an email or IM that are determined by correctness and contradiction detector 115 to be incorrect factually or as a contradiction. The highlighting may be accompanied that a statement to sender device 105 of the correct fact and/or a citation to a reference source regarding the fact or accompanied by a statement of the contradiction found and/or its date of statement. This highlighting and/or highlighting with additional information can be generated to a display of sender device 105 via a user interface associated with sender device 105. Alternatively, or in conjunction with presentation on a display of sender device 105, the indication can be implemented for example by a voice flagging the user of sender device 105 via the user interface associated with sender device 105. The indication in a voice communication can be made by a speaker of sender device 105 with the voice communication to the recipient muted out, with an accompanying recipient delay, during the audio presentation of the indication.

Correctness and contradiction detector 115 can provide detection scores to statistics aggregator 125. Statistics aggregator 125 can use these detection scores to update its correction and contradiction data regarding the user of sender device 105, to update data regarding the topic of the communication with recipient, and/or to update data regarding the user of recipient of recipient device 110. Statistics aggregator 125 can be communicatively coupled with a summarizer 130. Summarizer 130 can include a summary report generator 132 and/or a credibility calculator 134. Credibility calculator 134 can include a set of instructions, executable by a processor, which can generate credibility scores for the user of sender device 105 from the data provided by statistics aggregator 125. Summarizer 130 can convey the credibility scores to sender device 105. Credibility scores for the user of sender device 105 can be used as constructive feedback presented to sender device 105. A credibility score may be provided real-time during the conversation with the user of recipient device 110, which can allow the user of sender device 105 to have an opportunity to modify the manner in which she/he is conducting the conversation. Credibility scores can also be used as input to the correctness and contradiction detector. If a statement seems incorrect, but the user generating the statement is highly credible, the confidence of a correctness classifier may need to be higher before the statement gets flagged.

Summary report generator 132 can include a set of instructions, executable by a processor, which can generate reports regarding conversations conducted by the user of sender device 105, conversations conducted by the user of sender device 105 with the user of recipient device 110, and/or conversations regarding a topic about which the user of sender device 105 held one of more conversations and/or provided recorded discussions, spoken or non-spoken, regarding the topic. Summarizer 130 can output such reports to one or more devices other than sender device 105 to share these reports. Depending on the application, the reports may be shared, for example, with business managers and peers of the user of sender device 105.

In architecture 100, the one or more detectors 102 and correctness and contradiction detector 115 of system 101 with its interfaces to internal resources 122, external resources 124, and database of conversation histories 123 can be incorporated as part of sender device 105. Various components in architecture 100 can be distributed among a set of devices. Recipient device 110 can be a separate device from system 101. Recipient device 110 can be a device without any of the correctness and contradiction detector capabilities of system 101.

Figure 2:
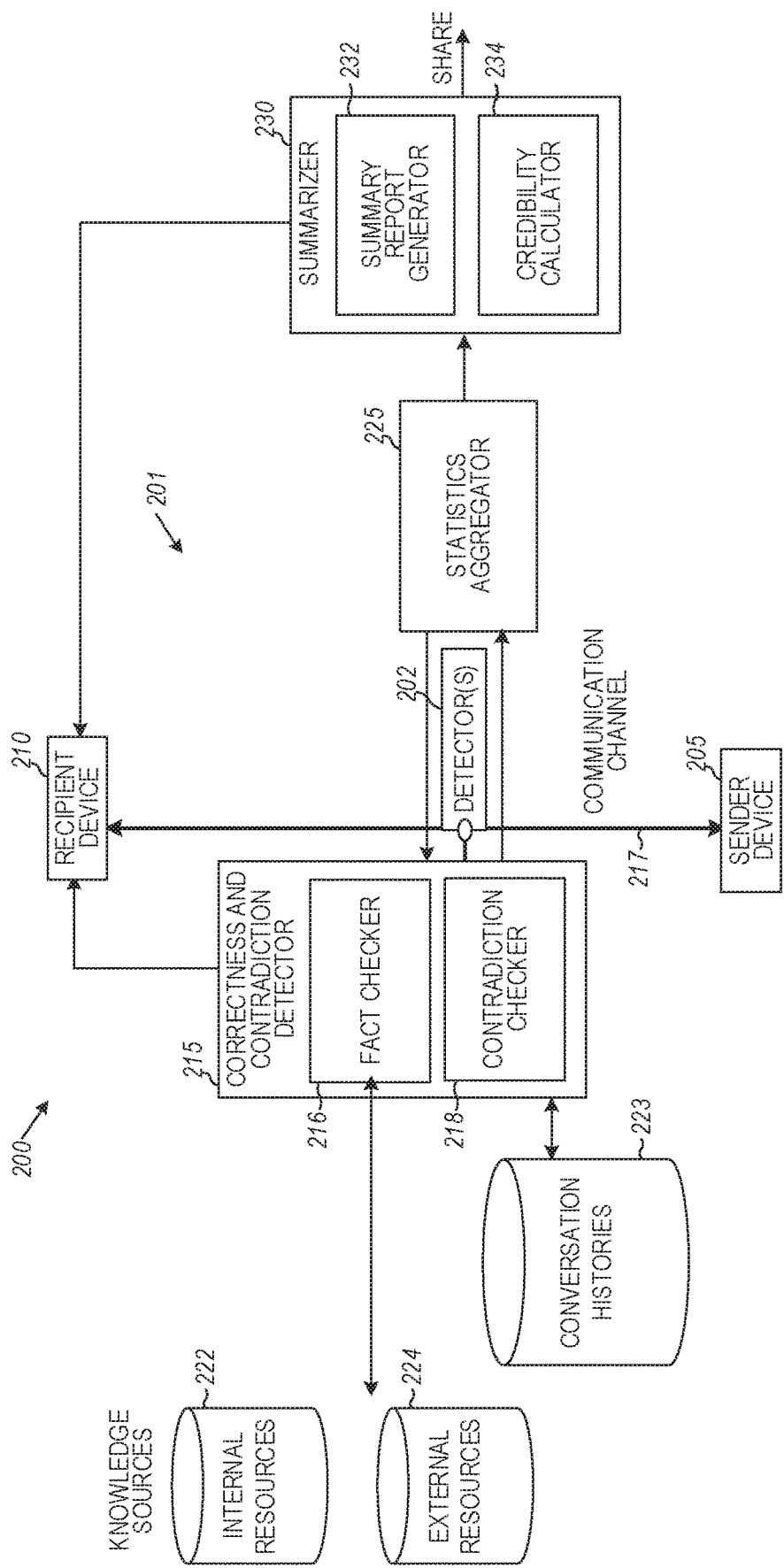
FIG. 2 is a schematic of an example architecture for a system that can detect correctness and/or consistency in communications between entities, in accordance with various embodiments.

FIG. 2 is a schematic of an embodiment of an example architecture 200 for a system 201 that can detect correctness and/or consistency in communications between entities. Architecture 200 can include system 201 having one or more detectors 202 arranged with respect to a communication channel 217, where the one or more detectors 202 provide input to a correctness and contradiction detector 215 of system 201, based on a communication in communication channel 217. The one or more detectors 202 may be arranged to monitor communication channel 217 at a selected location from within a sender device 205 to within a recipient device 205, depending on the application.

Correctness and contradiction detector 215 can include a fact checker 216 and a contradiction checker 218. Fact checker 216 can be communicatively coupled with knowledge sources, which may include internal resources 222 and/or external resources 224. Contradiction checker 218 can be communicatively coupled with a database of conversation histories 223. Correctness and contradiction detector 215 can provide inputs to a recipient device 210 based on content in a communication using communication channel 217 between recipient device 110 and a sender device 205.

Architecture 200 can be structured similar to architecture 100, except in architecture 200, recipient device 210 operates in conjunction with the one or more detectors 202 and the correctness and contradiction detector 215, in which sender device 205 need not have the capabilities to operate in conjunction with one or more detectors and a correctness and contradiction detector. System 201 can operatively observe a conversation between two entities, using one or more detectors 202, which entities are communicating using sender device 205 and recipient device 210 operating with respect to communication channel 217. The conversation may be a voice conversation between sender device 205 and recipient device 210. The conversation may include a video or graphic symbols of content that is part of the conversation such as a topic of the conversation, where the graphic symbols may provide a pictorial representation of the content. At the end of each statement of a conversation, such as a phrase, a sentence, a paragraph, or other selected interval, system 201 can assign an accuracy score based on system knowledge about the world, where the system knowledge can include personal data of the user of the sender device 205, data in an enterprise associated with recipient device 210, and data that is available on the open Internet. The one or more detectors 202 of system 201 can be realized as dialog listeners similar to the one or more detectors 102 of system 101 of FIG. 1.

The one or more detectors 202 of system 201, such as but not limited to dialog listeners, can be implemented as a network proxy that communications, which may be between individuals, pass through in route from sender device to recipient device. The one or more detectors 202 may be implemented in other ways to intercept network traffic, like electronic sniffing. For example, packet sniffing can be used, which allows individuals to capture data as it is transmitted over a network. Such sniffing techniques have been used by network professionals to diagnose network issues, and by malicious users to capture unencrypted data. The one or more detectors 202 of system 201 can be implemented to operate with user consent and to adhere to all state and federal laws regarding the interception of communications.

The one or more detectors 202 of system 201 can intercept messages sent between devices of two or more individuals over the course of a conversation. Such detectors can pass the content of the messages and any relevant metadata to other devices that can provide services. The services can include services of correctness and contradiction detector 215. The one or more detectors 202 of system 201 can allow the original messages to pass through, so that the messages reach the intended recipient devices. The one or more detectors 202 may record the communications for future analysis, though the one or more detectors 202 may refrain from recording in real-time operations.

By monitoring individual statements during a conversation, feedback regarding correctness and/or consistency can be conveyed to the user of recipient device 210 during the conversation. By monitoring individual statements of the user of the sender device 205 over time, inferences can be made about how frequently the statements are correct and how consistently the statements maintain a position of the user of sender device 205. These measures of correctness and/or consistency can be converted into scores that can be conveyed to the user of recipient device 210 to weigh the reliability of the information being shared with the user of recipient device 210 from the user of sender device 205. This score could also be aggregated across many conversations for the user of sender device 205 to estimate the credibility of the user of sender device 205 in general.

Once a communication in a communication channel has been monitored for an interval by the one or more detectors 202, a feature from the monitored communication can be extracted, the feature represents a portion of content of the communication. The feature may include, but is not limited to, a phrase, a sentence, a paragraph, an audio file, video or graphic symbols of content that is part of the communication monitored. The features can be extracted in a number of ways, for example, by a deep learning method, a natural language processing (NLP) method, and other information extraction methods. Such methods can be implemented to extract identify of entities associated with the conversation, relationships between the entities, along with features from the conversation. The methods can be used to convert the features into a consistent representation that can be compared across conversations and resources. The extraction procedure can be performed by correctness and contradiction detector 215.

Correctness and contradiction detector 215, similar to correctness and contradiction detector 115 of FIG. 1, includes instructions stored in a memory device that are executable by a process to convert the features into a consistent representation and/or to determine the occurrence of an incorrect statement and/or contradiction in the captured feature of the monitored communication. Correctness and contradiction detector 215 can be coupled with a statistics aggregator 225 to receive data regarding correctness and contradictions from prior communications of the user of sender device 205 with the recipient of the current communication or related prior communications. Correctness and contradiction detector 215 can include one or more bots, or other form of automated application, to access data from knowledge sources and/or repositories of historical data.

Fact checker 216 of correctness and contradiction detector 215 can be coupled with internal resources 222, such as but not limited to an intranet of an organization associated with the user of recipient device 210, which act as an internal database. Fact checker 216 can be coupled with external resources 224, such as but not limited to web sites via the Internet, which act as an external database. Real-time access to internal resources 222 and external resources 224 can provide one or more features for which to compare the representation of the feature extracted from monitoring the current communication. Contradiction checker 218 of correctness and contradiction detector 215 can be coupled with database of conversation histories 223 to provide one or more features of past conversations with the user of sender device 205 for which to compare the representation of the feature extracted from monitoring the current communication.

From the comparisons by fact checker 216 and/or contradiction checker 218, a measure of correctness of the extracted feature can be generated from one or more of the comparisons. Correctness and contradiction detector 215 can generate detector scores to recipient device 210, which can include an indication of the measure of correctness and/or the identification of the contradiction. The feedback to recipient device 210 can be conducted during the communication with sender device 205.

The indication can be implemented upon receipt of the message by the recipient device 210, for example by highlighting, or marking up in some other manner, inline parts of an email or IM that are determined by correctness and contradiction detector 215 to be incorrect factually or as a contradiction. The highlighting or markup may be accompanied that a statement to recipient device 210 of the correct fact and/or a reference regarding the fact or accompanied by a statement of the contradiction found and/or its date of statement. This highlighting and/or highlighting with additional information can be generated to a display of recipient device 210 via a user interface associated with recipient device 210. Alternatively, or in conjunction with presentation on a display of recipient device 210, the indication can be implemented for example by out-of-band notifications of voice messages flagging recipient device 210 via a user interface associated with recipient device 210. The indication in a voice communication can be made by a speaker of recipient device 210 with the voice communication to the sender muted out, with an accompanying delay, during the audio presentation of the indication.

Correctness and contradiction detector 215 can provide detection scores to statistics aggregator 225. Statistics aggregator 225 can use these detection scores to update its correction and contradiction data regarding the user of sender device 205, to update data regarding the topic of the communication with recipient, and/or to update data regarding the user of recipient of recipient device 210. Statistics aggregator 225 can be communicatively coupled with a summarizer 230. Summarizer 230 can include a summary report generator 232 and/or a credibility calculator 234. Credibility calculator 234 can include a set of instructions, executable by a processor, which can generate credibility scores about the user of sender device 205 from the data provided by statistics aggregator 225. Summarizer 230 can convey the credibility scores to recipient device 210. Credibility scores about the user of sender device 205 can be used by recipient device 210 as a measure of how much the user of recipient device 210 can trust the user of sender device 205.

Summary report generator 232 can include a set of instructions, executable by a processor, which can generate reports regarding conversations conducted by the user of recipient device 210, conversations conducted by the user of recipient device 210 with the user of sender device 205, and/or conversations regarding a topic about which the user of sender device 205 held one of more conversations and/or provided recorded discussions, spoken or non-spoken, regarding the topic. Summarizer 230 can output such reports to devices other than recipient device 210 to share these reports. Depending on the application, the reports may be shared with business managers and peers.

In architecture 200, the one or more detectors 202 and correctness and contradiction detector 215 of system 201 with its interfaces to internal resources 222, external resources 224, and database of conversation histories 223 can be incorporated as part of recipient device 210. Various components in architecture 200 can be distributed among a set of devices. Sender device 205 can be a separate device from system 201. Sender device 205 can be a device without any of the correctness and contradiction detector capabilities of system 201.

Since recipient device 210 operates with system 201 having one or more detectors 202 and correctness and contradiction detector 215 with its interfaces to internal resources 222, external resources 224, and database of conversation histories 223, recipient device 210 and system 201 can be structured to include the capabilities of sender device 105 and system 101 of FIG. 1, allowing recipient device 210 to also function as a sender with correctness and contradiction detector capabilities. Likewise, sender device 105 and system 101 of FIG. 1 can be structured to include the capabilities of recipient device 210 and system 201 of FIG. 2, allowing sender device 105 to also function as a recipient with correctness and contradiction detector capabilities of a recipient.

Figure 3:
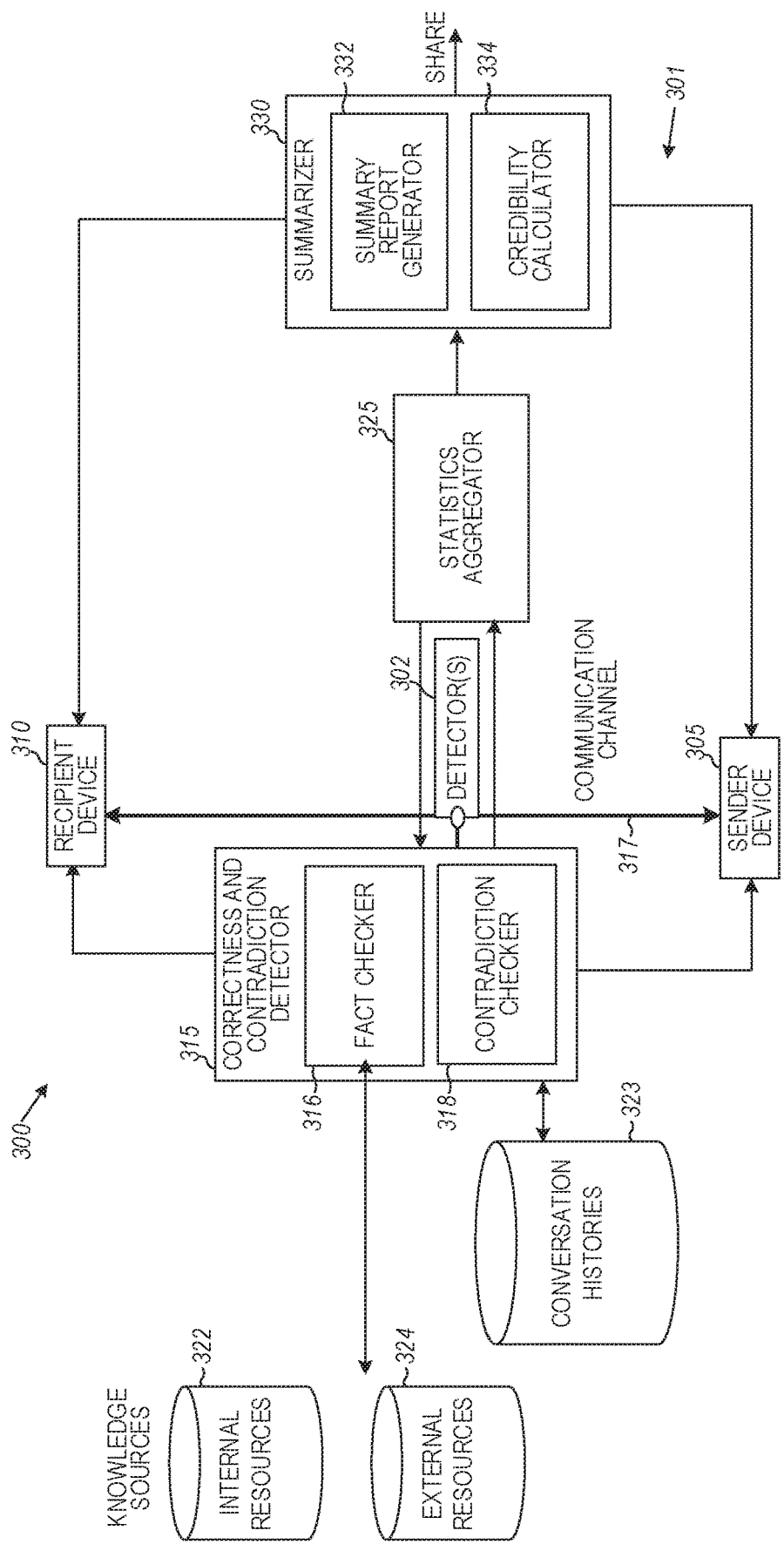
FIG. 3 is a schematic of an example architecture that can include detection of correctness and/or consistency in communications between entities, in accordance with various embodiments.

FIG. 3 is a schematic of an embodiment of an example architecture 300 that can include detection of correctness and/or consistency in communications between entities. In architecture 300, a sender device 305 is in communication with a recipient device 310 via a communication channel 317. Sender device 305 can be associated with its own detector components to monitor communications with a recipient device 310 via a communication channel 317 and components to conduct detection of correctness and/or consistency in communications between the two entities. Likewise, recipient device 310 can be associated with its own detector components to monitor communications with a sender device 305 via communication channel 317 and components to conduct detection of correctness and/or consistency in communications between the two entities. Alternatively, a system 301 with its own detector components to monitor communications in a selected communication channel and components to conduct detection of correctness and/or consistency in communications in the selected communication channel can be structured separate from sender device 305 and recipient device 310 to perform correctness and contradiction detector and notification functions.

System 301 can include components that can include: one or more detectors 302 arranged with respect to a communication channel 317; a correctness and contradiction detector 315 having a fact checker 316 with interfaces to internal resources 322 associated with sender device 305 and/or recipient device 310 and external resources 324 and having a contradiction checker 118 with an interface to a database of conversation histories 323 of the sender and/or the recipient; a statistics aggregator 325; and a summarizer 330 having a summary report generator 332 and credibility calculator 334. These components of system 301 can operate with respect to sender device 305 as discussed with respect to sender device 105 and system 101 of FIG. 1 and operate with respect to recipient device 310 as discussed with respect to recipient device 210 and system 201 of FIG. 2.

System 301 can be realized as a cloud architecture. Such a cloud architecture can provide the correctness and contradiction detector and notification functions of system 301 as a service to entities associated with sender device 305 and recipient device 310. System 301 may be provided as a virtual machine.

Consider the following as an example of real-time fact checking during the composition of an instant message, as taught herein. A party prepares a message stating "The Microsoft stock price has risen every day for the past two weeks." Before transmitting the message in a communication channel to a recipient, a system structured to provide correctness and contradiction detection and notification functions can provide to the party an indication stating "The Microsoft stock price has riseneverydayforthepasttwoweeks. FALSE: Microsoft stock dropped two days in the past two weeks." This notification includes highlighting using the underlining and stating the correct facts.

Consider the following as an example of real-time contradiction detection, as taught herein. A party prepares a message stating "We should hire John Smith." Before transmitting the message in a communication channel to a recipient, a system structured to provide correctness and contradiction detection and notification functions can provide to the party an indication stating "We should hireJohnSmith. WAIT: Last week you said no hire." This notification includes highlighting using the underlining and stating the contradiction.

Figure 4:
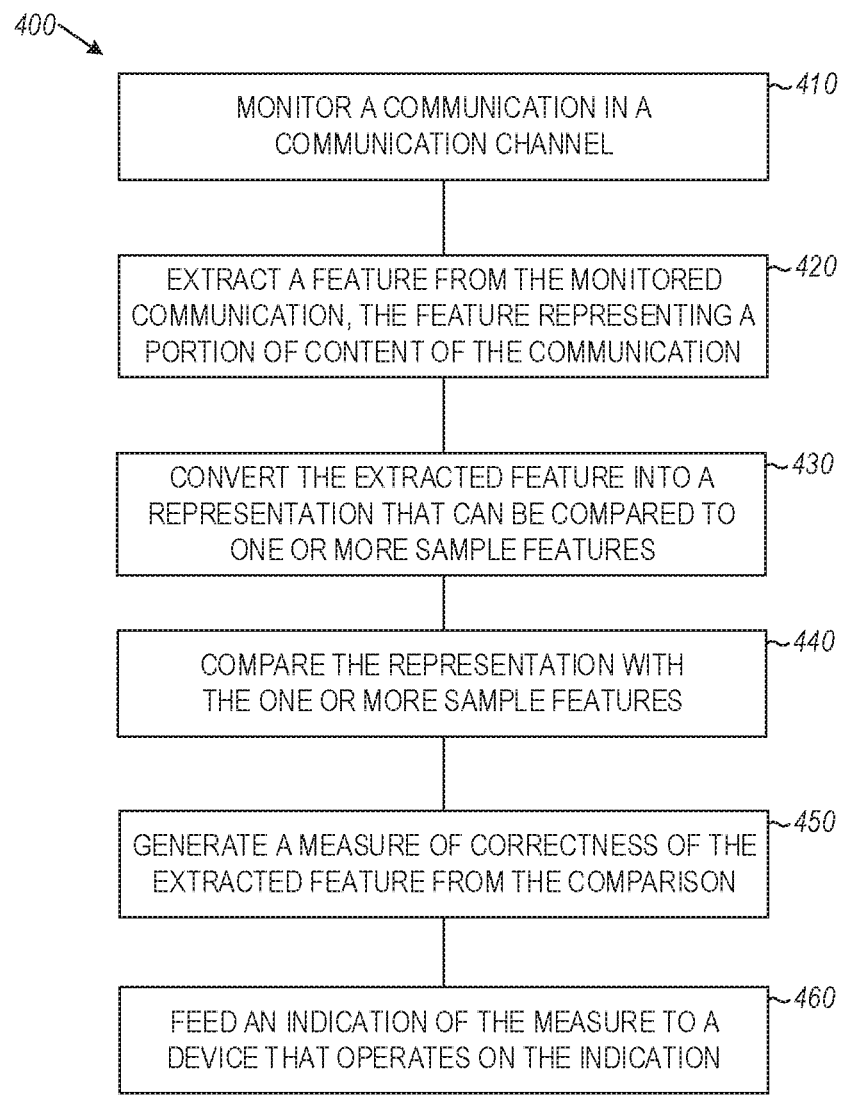
FIG. 4 is a flow diagram of features of an example processor implemented method of identifying a measure of correctness and/or an identification of a contradiction, and notifying a device regarding the correctness and/or the identification of a contradiction, in accordance with various embodiments.

FIG. 4 is a flow diagram of features of an embodiment of an example processor implemented method 400 of identifying a measure of correctness and/or an identification of a contradiction, and notifying a device regarding the correctness and/or the identification of a contradiction. At 410, a communication in a communication channel is monitored. At 420, a feature from the monitored communication is extracted, where the feature represents a portion of content of the communication. Extracting the feature from the monitored communication can include extracting a statement from the monitored communication, the statement originating from an individual in a communication among people or originating from an artificial intelligent assistant. Extracting the feature can include extracting one or more types of features from a group including an audio signal, graphic symbols, and an image file. Extracting the feature from the monitored communication can include extracting the feature using one or more machine processing techniques. The machine processing techniques can include, but are not limited to, one or more of natural language processing or deep learning.

At 430, the extracted feature is converted into a representation that can be compared to one or more sample features. Depending on the extracted feature, the representation can be the extracted feature. This correspondence of extracted feature and representation can occur when an extracted process such as natural language processing or deep learning determines there are no inconsistencies or an amount below a threshold level of inconsistencies with respect to the entities associated with the communication and their relationship to the communication. A consistent representation can include the feature converted to one or more formats of one or more stored sample features for comparison of the feature with the one or more stored sample features. The one or more sample features can be accessed from one or more databases. At 440, the representation is compared with one or more sample features.

At 450, a measure of correctness of the extracted feature and/or an identification of a contradiction is generated from the comparison. The measure of correctness can include a numeric value in a range, where one end of the range indicates that the extracted feature is completely correct and the other end of the range indicates that the extracted feature is completely incorrect. Numeric values between the ends of the range indicate different levels of the extracted feature being partially correct. Generating the measure of correctness can include performing a fact check with respect to the extracted feature. Generating the measure of correctness can include assigning an accuracy score to the extracted feature. Assigning the accuracy score can include using one or more electronic knowledge sources from a group including a database of stored historical data associated with the communication, an internal source via an intranet, and an external source via an internet.

At 460, an indication of the measure and/or the identification of the contradiction can be fed to a device that operates on the indication. Feeding the indication of the measure and/or the identification to the device can include feeding the indication of the measure and/or the identification to a device of a sender, a device of a recipient, and/or to a database to store the indication with respect to parameters of the communication. The parameters of the communication can include, but is not limited to, identities of the sender and the one or more recipients, subject matter of the communication, and information related to the sender, the one or more recipients, the subject matter, and transmission of the communication. Feeding the indication of the measure can include sending, in response to a determination from the fact check that the extracted feature is false or partially false, a notification that the extracted feature is false or partially false to the device, and/or sending a correct version of the extracted feature to the device. Feeding the identification of the contradiction can include sending to the device, in response to a determination from the contradiction detection that the extracted feature is contradicted by the one or more sample features, a notification of a detected contradicting feature to the extracted feature and/or sending the detected contradicting feature. Feeding the indication of the measure and/or the identification of the contradiction can include sending the indication to a source of the extracted feature or sending the indication to a recipient of the extracted feature. Feeding the indication of the measure and/or the identification to a device can include feeding the indication of the measure and/or the identification to a cloud-based database.

Variations of processor implemented method 400 or processor implemented methods similar to processor implemented method 400 can include a number of different embodiments that may be combined depending on the application of such methods and/or the architecture of systems in which such methods are implemented. Such methods can include feeding the indication of the measure and/or the identification of the contradiction to the device during a real-time transaction of the communication, and/or aggregating statistics associated with the communication and generating a summary report having a credibility assessment, based on the statistics, correlated to the communication. The credibility assessment can be fed back into the system, for example, to adjust confidence thresholds for notifications. A highly-credible user may be more trusted and have a higher notification threshold.

Elements associated with the architectures, as taught herein, may communicate over a network. The network may include local-area networks (LAN), wide-area networks (WAN), wireless networks (e.g., a IEEE 802.11 wireless local area network or a cellular wireless wide area network), the Public Switched Telephone Network (PSTN) network, ad hoc and device-to-device (D2D) networks, personal area networks (e.g., Bluetooth) or other combinations or permutations of network protocols and network types. The networks may include a single local area network (LAN), a wide-area network (WAN), or a combinations of LANs and/or WANs, such as the Internet. The various devices coupled to network may be coupled to the network via one or more wired or wireless connections.

Embodiments described herein may be implemented in one or a combination of hardware, firmware, and software. Embodiments may also be implemented as instructions stored on one or more machine-readable storage devices, which may be read and executed by at least one processor to perform the operations described herein. A machine-readable storage device may include any non-transitory mechanism for storing information in a form readable by a machine, for example, a computer. For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Components may be hardware, software, or firmware communicatively coupled to one or more processors in order to carry out the operations described herein. Components may be hardware components, and as such components may be considered tangible entities capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine-readable medium.

In an example, the software, when executed by the underlying hardware of the component, causes the hardware to perform the specified operations. Accordingly, the term hardware component is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which components are temporarily configured, each of the modules need not be instantiated at any one moment in time. For example, where the components comprise a general-purpose hardware processor configured using software; the general-purpose hardware processor may be configured as respective different components at different times. Software may accordingly configure a hardware processor, for example, to constitute a particular component at one instance of time and to constitute a different component at a different instance of time. Components may also be software or firmware components, which operate to perform one or more methodologies described herein.

For example, a non-transitory machine-readable storage device can comprise instructions, which when executed by a set of processors, can cause a system to perform operations, the operations comprising operations to: monitor a communication in a communication channel; extract a feature from the monitored communication, the feature representing a portion of content of the communication; convert the extracted feature into a representation that can be compared to one or more sample features; compare the representation with one or more sample features; generate a measure of correctness of the extracted feature and/or an identification of a contradiction from the comparison; and feed an indication of the measure and/or the identification of the contradiction to a device that operates on the indication. The indication may be sent to a user interface of a device of a sender, a user interface of a device of a recipient, a database to provide analysis, or combinations thereof.

The operations to generate the measure of correctness can include operations to: perform a fact check with respect to the extracted feature and/or perform a contradiction detection with respect to the extracted feature; send to the device, in response to a determination from the fact check that the extracted feature is false or partially false, a notification that the extracted feature is false or partially false to the device, and/or send a correct version of the extracted feature; and send to the device, in response to a determination from the contradiction detection that the extracted feature is contradicted by the one or more sample features, a notification of a detected contradicting feature to the extracted feature and/or send the detected contradicting feature.

Variations of the operations or similar operation can include operations to feed the indication of the measure and/or the identification of the contradiction to the device during a real-time transaction of the communication, and/or to aggregate statistics associated with the communication and generate a summary report having a credibility assessment correlated to the communication. Such operations can include one or more of the operations associated with processor implemented method 400, processor implemented methods similar to processor implemented method 400, or other processor implemented methods as taught herein.

In various embodiments, a system can comprise a set of processors and a storage apparatus comprising instructions, which when executed by the set of processors, cause the system to perform operations. The operations can include operations to: monitor a communication in a communication channel; extract a feature from the monitored communication, the feature representing a portion of content of the communication; convert the extracted feature into a representation that can be compared to one or more sample features; compare the representation with one or more sample features; generate a measure of correctness of the extracted feature and/or an identification of a contradiction from the comparison; and feed an indication of the measure and/or the identification of the contradiction to a device that operates on the indication. The system can include one or more interfaces to one or more electronic knowledge sources, and the instructions can include instructions to check facts and/or check for contradictions in the representation by use of a comparison of the representation with one or more sample features from access to the one or more electronic knowledge sources.

Variations of a system regarding identification and notification of correctness of a communication can include a number of different embodiments that may be combined depending on the application of such systems and/or the architecture in which systems are implemented. Such systems can include instructions to assign an accuracy score to the extracted feature as a portion of the measure of correctness of the extracted feature. Such systems can include instructions to extract the feature from the monitored communication by use of by use of one or more machine processing techniques. The machine processing techniques can include, but are not limited to, one or more of natural language processing or deep learning. Such systems can include instructions to aggregate statistics associated with the communication and to generate a summary report having a credibility assessment correlated to the communication.

Figure 5:
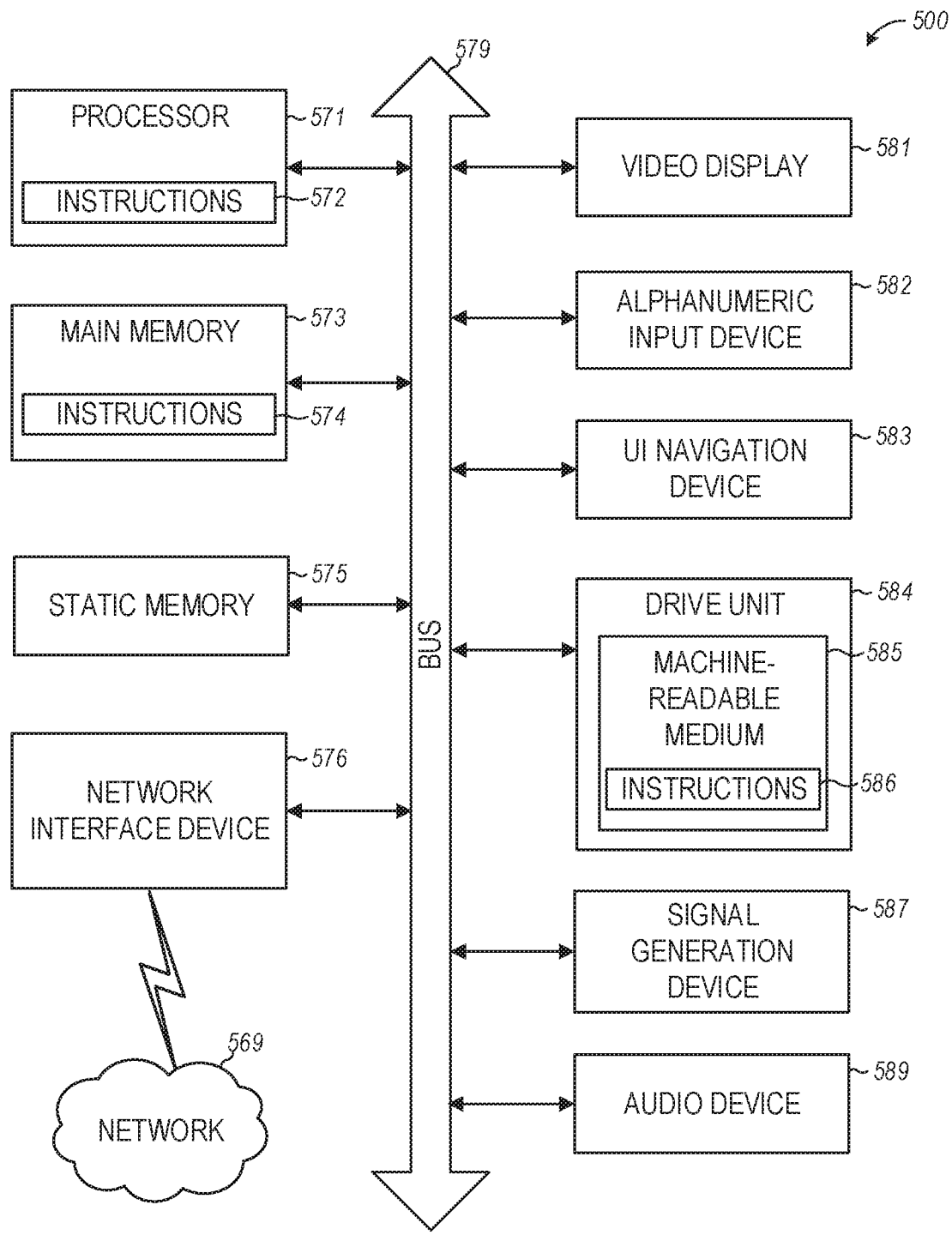
FIG. 5 is a block diagram illustrating features of an example machine system, in accordance with various embodiments.

FIG. 5 is a block diagram illustrating features of an embodiment of a machine system 500, within which a set or sequence of instructions may be executed to cause the machine to perform any one of the methodologies discussed herein. Machine system 500 represents one or more machines associated with correction and contradiction identification and notification architectures, as taught herein. Machine system 500 may be a machine that operates as a standalone device or may be networked to other machines. In a networked deployment, the machine system 500 may operate in the capacity of either a server or a client machine in server-client network environments, or it may act as a peer machine in peer-to-peer (or distributed) network environments. Further, while machine system 500) is shown only as a single machine, the term "machine system" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Machine system 500 can include one or more processors 571, a main memory 573 and a static memory 575, which communicate with each other via a link 579 (e.g., a bus). Machine system 500 may further include a video display unit 581, an alphanumeric input device 582 (e.g., a keyboard), and a user interface (UI) navigation device 583 (e.g., a mouse). Video display unit 581, alphanumeric input device 582, and UI navigation device 583 may be incorporated into a touch screen display. A UI of machine system 500 can be realized by a set of instructions that can be executed by processor 571 to control operation of video display unit 581, alphanumeric input device 582, and UI navigation device 583. The UI can control real-time fact checking in conjunction with a correctness and contradiction detector embedded in instructions in components of machine system 500. The correctness and contradiction detector of machine system 500 can be realized similar to correctness and contradiction detector 115, correctness and contradiction detector 215, correctness and contradiction detector 315, or similar correctness and contradiction detector. The UI can be associated with a bot or a personal assistant. The real-time fact checking may be conducted by the bot or the personal assistant, which can be integrated in machine system 500, during the creation of a communication, such as but not limited to, an IM, email, or other conversational communication.

Machine system 500 may additionally include a storage device 584 (e.g., a drive unit), a signal generation device 587 (e.g., a speaker), a network interface device 576, and one or more sensors (not shown), such as a global positioning system (GPS) sensor, compass, accelerometer, or other sensor. Machine system 500 may also include an audio device 589 having an audio input, such as for example a microphone, and an audio output, such as for example a speaker. Audio device 589 may be arranged as a dialog listener that can provide communications from a selected communication channel to a correctness and contradiction detector to perform correction and contradiction identification and notification functions, as taught herein. The communications may be provided using link 579 in a wired transmission or a wireless transmission.

Storage device 584 can include a machine-readable medium 585 on which is stored one or more sets of data structures and instructions 586 (e.g., software) embodying or utilized by any one or more of the methodologies or functions described herein. The instructions 586 may also reside, completely or at least partially, within the main memory 573, static memory 575, and/or within the processors 571 during execution thereof by machine system 500, with main memory 573, static memory 575, and processors 571 also constituting machine-readable media Components of a correction and contradiction identification and notification architecture, as taught herein, can be distributed as modules having instructions in one or more of the machine-readable medium 585, main memory 573, static memory 575, and/or within the processors 571 during execution thereof by machine system 500.

While the machine-readable medium 585 is illustrated in an example embodiment to be a single medium, the term "machine-readable medium" may include a single medium or multiple media (e.g., a centralized or distributed database, and/or associated caches and servers) that store the one or more instructions 586. The term "machine-readable medium" shall also be taken to include any tangible medium that is capable of storing, encoding or carrying instructions for execution by the machine and that cause the machine to perform any one or more of the methodologies taught herein or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 586 may further be transmitted or received over a communications network 569 using a transmission medium via the network interface device 576 utilizing any one of a number of well-known transfer protocols (e.g., HTTP). In addition, communications network 569 may operably include a communication channel propagating messages between entities for which a correction and contradiction identification and notification procedure can be conducted. Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

By monitoring individual statements of a user over time from one or more devices, inferences can be made about how frequently the statements are correct and how consistently the statements maintain a position. These measures of correctness and/or consistency can be converted into scores that could be conveyed to the user or another person to weigh the reliability of the information being shared. This score could also be aggregated across many conversations for that user to estimate their credibility in general. The user may choose to provide consent to share that score more broadly. Beyond interpersonal communications, other applications of a correctness and/or consistency detection system can include, but is not limited to, such applications as document authoring, where the system can provide users with a mechanism to verify that the subject matter being written is accurate. In addition, such a system can be applied to observe, store, and analyze patterns in the contradictions of one or more individuals and between individuals in a group setting.

In various embodiments, systems can be implemented to provide real-time processing of communications to determine correctness facts that are being mentioned. This real-time processing can be conducted for applications such as, but not limited to, meetings, voice conversations. IM, email, phone calls, etc. Such systems can cross reference facts that are mentioned against data/information on the web, within news programs, and other trusted sources. Facts that are mentioned can be cross referenced against data within an organization or tenant to check for correctness. Facts that are mentioned can be cross referenced against a conversation history of the people involved to check for correctness and accuracy with the past conversations. Helping with real-time communication fact checking, as taught herein, to optimize for better decision making in real-time can provide enhancements over systems that tag specific posts and search results as "verified" or "trusted" unrelated to conversations held in real-time. A trust/credibility score for individuals based on the overall accuracy of their communications can be created. An individual's "trust/credibility" score can be used to help the individual grow their personal network and personal connections within their organization or externally. This score can be used to rate a person as an expert in a specific area that can then be added to the fact checking system.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:
1. A system comprising: a set of processors;
a storage apparatus comprising instructions, which when executed by the set of processors, cause the system to perform operations to:
monitor a communication in a communication channel, the communication being part of a conversation between a first entity and a second entity;

extract a feature from the monitored communication, the feature representing a portion of content of the communication from the first entity to the second entity;

convert the extracted feature into a representation that can be compared to one or more sample features;

compare the representation with the one or more sample features;

generate a measure of correctness of the extracted feature;

access a measure of credibility for the first entity;

adjust a confidence threshold based on the measure of credibility;

compare the measure of correctness to the confidence threshold; and responsive to the measure of correctness exceeding the confidence threshold, feed an indication of the measure of correctness and/or an identification of a contradiction to a device or devices associated with the first entity, the second entity, or both.

2. The system of claim 1, wherein the system includes one or more interfaces to one or more electronic knowledge sources, and the instructions include instructions to check facts and/or check for contradictions in the representation by use of the comparison of the representation with the one or more sample features from access to the one or more electronic knowledge sources.

3. The system of claim 1, wherein the instructions include instructions to assign an accuracy score to the extracted feature as a portion of the measure of correctness of the extracted feature.

4. The system of claim 1, wherein the instructions include instructions to extract the feature from the monitored communication by use of one or more machine processing techniques.

5. The system of claim 1, wherein the instructions include instructions to aggregate statistics associated with the communication and to generate a summary report having a credibility assessment correlated to the communication.

6. A processor implemented method comprising:

monitoring a communication in a communication channel, the communication being part of a conversation between a first entity and a second entity;

extracting a feature from the monitored communication, the feature representing a portion of content of the communication;

converting the extracted feature into a representation that can be compared to one or more sample features;

comparing the representation with the one or more sample features;

generating a measure of correctness of the extracted feature and/or an identification of a contradiction from the comparison with the one or more sample features;

aggregating statistics related to the measure of correctness and/or the identification of the contradiction;

generate a credibility score based on the aggregated statistics; and adjusting a confidence threshold used to generate the measure of correctness and/or the identification of the contradiction based on the credibility score.

7. The processor implemented method of claim 6, wherein extracting the feature from the monitored communication includes extracting a statement from the monitored communication, the statement originating from an individual in a communication among people or originating from an artificial intelligent assistant.

8. The processor implemented method of claim 6, wherein generating the measure of correctness includes performing a fact check with respect to the extracted feature.

9. The processor implemented method of claim 8, further comprising sending a notification that the extracted feature is false or partially false to a device, and/or sending a correct version of the extracted feature to the device.

10. The processor implemented method of claim 6, further comprising storing the measure and/or the identification to a cloud-based database.

11. The processor implemented method of claim 6, further comprising sending to a device, a notification of a detected contradicting feature to the extracted feature, and/or sending the detected contradicting feature.

12. The processor implemented method of claim 6, wherein extracting the feature includes extracting one or more types of features from a group including an audio signal, graphic symbols, and an image file.

13. The processor implemented method of claim 6, further comprising sending an indication and/or the identification to a source of the extracted feature or sending the indication to a recipient of the extracted feature.

14. The processor implemented method of claim 6, wherein the credibility score relates to the first entity, or relates to the second entity, or relates to both the first entity and the second entity.

15. The processor implemented method of claim 14, wherein generating the measure of correctness includes assigning an accuracy score to the extracted feature and wherein assigning the accuracy score includes using one or more electronic knowledge sources from a group including a database of stored historical data associated with the communication, an internal source via an intranet, and an external source via an internet.

16. The processor implemented method of claim 6, wherein extracting the feature from the monitored communication includes extracting the feature using one or more deep learning techniques.

17. The processor implemented method of claim 6, wherein the processor implemented method includes feeding an indication of the measure of correctness and/or an identification of inconsistencies to a device during a real-time transaction of the communication, and/or generating a summary report having the credibility score, based on the statistics, correlated to the communication.

18. A non-transitory machine-readable storage device comprising instructions, which when executed by a set of processors, cause a system to perform operations, the operations comprising operations to:

monitor a communication in a communication channel, the communication being part of a conversation between a first entity and a second entity;

extract a feature from the monitored communication, the feature representing a portion of content of the communication;

convert the extracted feature into a representation that can be compared to one or more sample features;

compare the representation with the one or more sample features;

generate a measure of correctness of the extracted feature and/or an identification of a contradiction from the comparison;

aggregate statistics from the measure of correctness and/or the identification of the contradiction;

generate a credibility score based on the aggregated statistics;

adjust a confidence threshold used to generate the measure of correctness and/or the identification of the contradiction based on the credibility score;

feed an indication of the measure of correctness and/or the identification to a first device associated with the first entity, a second device associated with the second entity, or the first device and the second device.

19. The non-transitory machine-readable storage device of claim 18, wherein feed an indication of the measure of correctness comprises send to the first device or the second device a notification that the extracted feature is false or partially false, and/or send a correct version of the extracted feature.

20. The non-transitory machine-readable storage device of claim 18, further comprising generate a summary report having the credibility score.

* * * * *